(12) United States Patent
Tan

(10) Patent No.: US 7,505,162 B2
(45) Date of Patent: Mar. 17, 2009

(54) DIGITAL SCANNING SYSTEMS AND METHODS FOR SCANNING MULTI-SIDED CARDS AND DOCUMENTS

(75) Inventor: Hin Leong Tan, Santa Clara, CA (US)

(73) Assignee: Electronic Document Technology Pte., Ltd., Singapore (SG)

( * ) Notice: Subject to any disclaimer, the term of this patent is extended or adjusted under 35 U.S.C. 154(b) by 934 days.

(21) Appl. No.: 10/772,608

(22) Filed: Feb. 5, 2004

(65) Prior Publication Data
US 2005/0174613 A1    Aug. 11, 2005

(51) Int. Cl.
*G06F 3/12* (2006.01)

(52) U.S. Cl. .................. 358/1.15; 358/474; 358/450; 382/284; 382/289; 379/203; 345/629; 395/773; 395/326

(58) Field of Classification Search .......... 358/474, 358/540, 450, 488, 1.2, 468, 1.15, 442, 402, 358/486, 505; 382/284, 289, 296, 297, 216; 379/100.17, 93.31, 93.32; 345/619–620, 345/624, 629, 723, 771; 395/773, 326–358
See application file for complete search history.

(56) References Cited

U.S. PATENT DOCUMENTS

| | | | | |
|---|---|---|---|---|
| 5,654,807 A * | 8/1997 | Miyaza | ............ | 358/450 |
| 5,717,941 A * | 2/1998 | Yoshida et al. | ............ | 715/234 |
| 5,734,915 A * | 3/1998 | Roewer | ............ | 715/512 |
| 5,856,888 A * | 1/1999 | Ross et al. | ............ | 359/857 |
| 5,938,738 A | 8/1999 | Mu-Teng | | |
| 5,956,158 A * | 9/1999 | Pinzarrone et al. | ............ | 358/474 |
| 6,003,093 A * | 12/1999 | Kester | ............ | 719/321 |
| 6,145,014 A | 11/2000 | Chong | | |
| 6,151,426 A | 11/2000 | Lee et al. | | |
| 6,417,935 B1 * | 7/2002 | Saito et al. | ............ | 358/450 |
| 6,425,001 B2 * | 7/2002 | Lo et al. | ............ | 709/217 |
| 6,480,304 B1 | 11/2002 | Os et al. | | |
| 6,489,973 B1 * | 12/2002 | Heiden | ............ | 715/771 |
| 6,686,930 B2 * | 2/2004 | Powers et al. | ............ | 715/724 |
| 7,002,700 B1 * | 2/2006 | Motamed | ............ | 358/1.1 |
| 7,039,876 B2 * | 5/2006 | Lavendel et al. | ............ | 715/777 |
| 7,167,254 B1 * | 1/2007 | Abe | ............ | 358/1.15 |
| 2001/0014908 A1 * | 8/2001 | Lo et al. | ............ | 709/203 |
| 2001/0033388 A1 * | 10/2001 | Kotani | ............ | 358/1.12 |
| 2003/0177448 A1 * | 9/2003 | Levine et al. | ............ | 715/530 |
| 2004/0008380 A1 * | 1/2004 | Sawamura | ............ | 358/1.18 |

* cited by examiner

*Primary Examiner*—Negussie Worku
(74) *Attorney, Agent, or Firm*—Douglas L. Weller; Robert Moll

(57) ABSTRACT

The present invention relates to scanning multi-sided documents. The scanner device scans the multi-sided document one side at a time. The image of each side is tiled vertically or horizontally to form a composite image, which is transferred from the source to the application based on the TWAIN protocol. The source is TWAIN compliant, and it allows any TWAIN application to scan and process multi-sided cards as a single composite image. The source provides a TWAIN user interface which allows the user to select scanning parameters and options. The invention also provides a method of implementing a TWAIN source to use the document sensor on a scanner to efficiently scan single or multi-sided cards based on the TWAIN protocol. The source checks the status of the document sensor when the TWAIN user interface is displayed, and automatically starts scanning when a document is detected by the sensor.

18 Claims, 8 Drawing Sheets

TWAIN Source User Interface

Scanner Model A

Scan Parameters

Image Type:  ◉ Color        ◎ Black/White

Resolution:  ◎ 300    ◉ 400    ◎ 600

Size (inch):  ◉ 8.5 x 11.0   ◎ 3.5 x 2.5

( SCAN )          ( COMMAND A )

( CLOSE )         ( COMMAND B )

Figure 2

Vertically Tiled Images

Horizontally tiled images

TWAIN Source User Interface

| Scanner Model A |
|---|

Scan Parameters

Image Type: ⊚ Color      ⊚ Black/White

Resolution: ⊚ 300   ⊚ 400   ⊚ 600

Size (inch): ⊚ 8.5 x 11.0   ⊚ 3.5 x 2.5

52 ⟶ [X] Scan Multi-Sided Card

Numer of Sides: ⊚ 2   ⊚ 3   ⊚ 4

Tile images: ⊚ Horizontally   ⊚ Vertically

54 ⟶ [X] Auto-Start scan when card is on scanner ( SCAN )     ( COMMAND A )

( CLOSE )     ( COMMAND B )

Figure 4

DIGITAL SCANNING SYSTEMS AND METHODS FOR SCANNING MULTI-SIDED CARDS AND DOCUMENTS

BACKGROUND

The present invention relates to digital scanning systems and methods for scanning multi-sided cards and documents.

The availability of low cost high quality scanners has resulted in scanning of information from physical media in many contexts. A scanner may be used to scan a card or document such as a business card, an identification card, a driver's license, a health insurance card, a passport, and other documents with information and/or graphic content. Many cards and documents have information on two or more sides, but low cost scanners are physically limited to scanning one side of a card or document at a time.

The TWAIN Specification Version 1.9, ratified by the TWAIN Working Group Committee as of Jan. 20, 2000, incorporated herein by reference, provides an application programming interface and protocol between imaging software applications and scanner hardware. See www.twain.org for additional details. Although the TWAIN specification provides a suitable interface between a software application and the scanner device, TWAIN fails to specify how multi-sided cards or documents should be scanned to form a composite image. Also many scanners have a sensor to detect the presence of a card or document, but TWAIN does not describe how to efficiently use the sensor to automate the scanning process.

SUMMARY OF THE INVENTION

The invention relates to systems and methods for scanning multi-sided cards and documents. In an embodiment, the system scans each side of a multi-sided card or document, and produces a composite image which is transferred from the scanning source to the application. This allows a TWAIN compatible application to scan and process multi-sided cards as a composite image. The invention also relates to systems and methods of using a document or a card sensor on a scanner to automatically scan single or multi-sided documents or cards. The scanning source checks the status of the sensor when the user interface is displayed, and may close a user interface and scan when the card or document is detected at the sensor.

BRIEF DESCRIPTION OF THE DRAWINGS

FIG. 2 illustrates a TWAIN source user interface with scan parameters and options.

FIG. 4 is a TWAIN source user interface with options for scanning a multi-sided card and automatic scanning when the card is detected on the scanner.

DETAILED DESCRIPTION OF THE PREFERRED EMBODIMENTS

The following description includes the best mode of carrying out the invention. It is made for the purpose of illustrating the general principles of the invention and should not be taken in a limiting sense. The scope of the invention is determined by reference to the claims. Each step or part is assigned its own part number throughout the specification and drawings.

Figure 1:
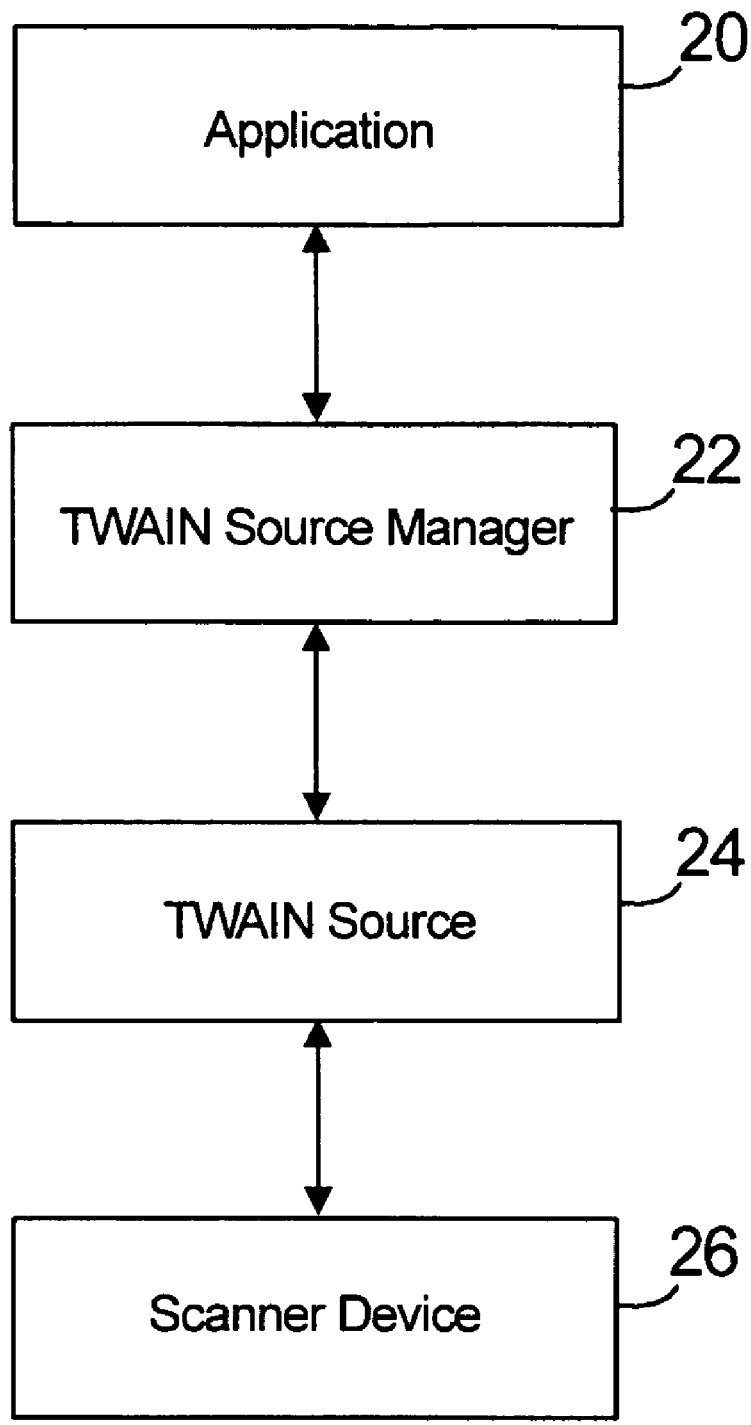
FIG. 1 illustrates the elements of the TWAIN architecture.

FIG. 1 shows the elements of the TWAIN architecture for linking software applications to known physical scanner devices. An application 20 running in a computer will interface with a physical scanner device 26 by communicating with the TWAIN source manager 22. The TWAIN source manager 22 is a program that manages all communications between the application 20 and a TWAIN source 24. The TWAIN source 24 is a program which communicates and controls the operations of the physical scanner device 26. The TWAIN source 24 also communicates with the TWAIN source manager 22 and causes the physical scanner device 26 to perform the operations requested by the TWAIN source manager 22. For brevity sake, the document scanned will be primarily referred to as a card. However, it should be recognized that the invention could be used to scan any document having information and/or graphic content on one or multiple sides.

The TWAIN specification requires every TWAIN source 24 to have a user interface sometimes abbreviated UI. FIG. 2 shows a user interface for a TWAIN source 24. The user interface is displayed by the TWAIN source 24 when the application 20 initiates a scan, and allows the user to specify scan parameters such as image size, type and resolution. From the UI the user can perform specific tasks defined by the TWAIN source 24, such as calibration, or other commands, by clicking on the appropriate command button. The UI typically has a scan (or start) button that the user clicks to begin scanning. The application 20 that does not want the UI to be displayed can instruct the TWAIN source 24 to hide the UI.

Figure 3A:
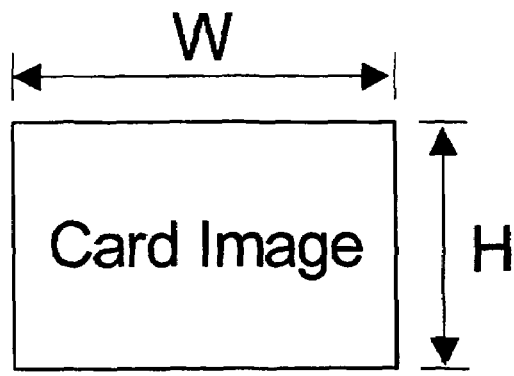
FIG. 3A illustrates a card image.
Figure 3B:
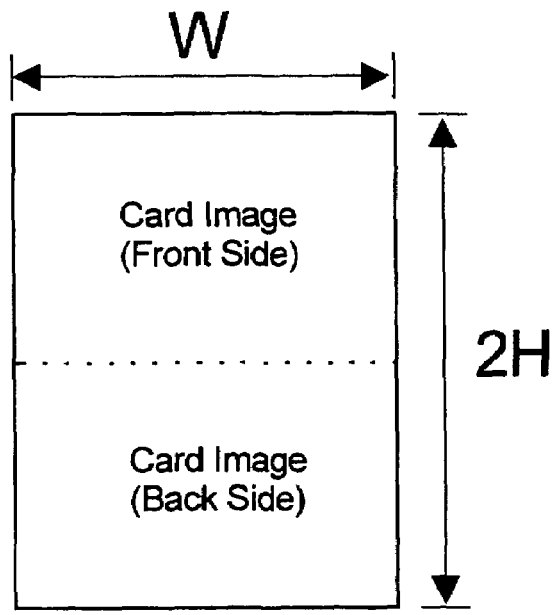
FIG. 3B illustrates a composite image formed by vertically tiling front and back images of the card of FIG. 3A.
Figure 3C:
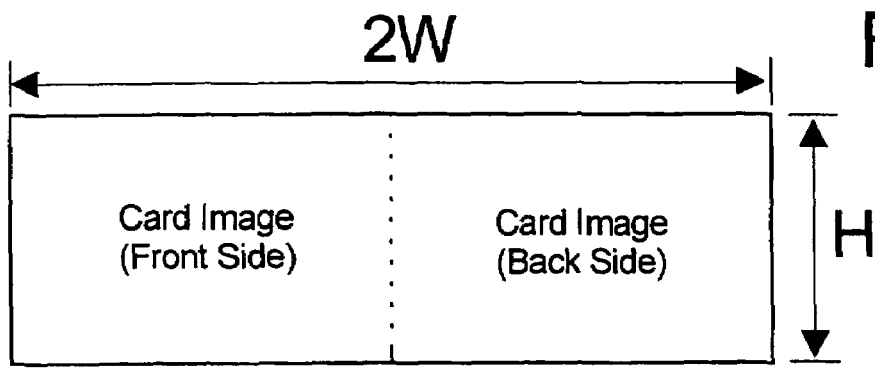
FIG. 3C illustrates a composite image formed by horizontally tiling front and back images of the card of FIG. 3A.

FIG. 3A shows an image of a card. The image has a width of W pixels and height of H pixels. A card that is printed on the front and back has two sides and therefore two corresponding images, each of size (W×H) pixels. A composite image of a double-sided card can be generated by vertically tiling the images of the front and back as shown in FIG. 3B. The images can also be tiled horizontally to create a composite image as shown in FIG. 3C. For cards with more than two sides, the composite image can be formed by tiling the image of each side vertically, or horizontally, or by a combination of vertical and horizontal placements.

FIG. 4 shows a TWAIN source user interface with scan parameters and two checkboxes 52 and 54. The user can mark the checkbox 52 for multi-sided card scanning and checkbox 54 to automatically scan when a card is placed on the scanner. If the multi-sided card checkbox 52 is not marked (i.e. disabled), the TWAIN source 24 will scan using single-side mode and return the image of the scanned side to the application 20 at the end of the scan. If checkbox 52 is marked, the TWAIN source 24 will scan in multi-side mode, generate a composite image of the scanned sides as shown in FIGS. 3B-3C, and return the composite image to the application 20.

If the user marks checkbox 54, the card sensor on the scanner device 26 will detect the presence of a card. If checkbox 54 is marked (i.e. enabled), the TWAIN source 24 will continuously check the status of the card sensor on the scanner device 26 when the UI is displayed. When a card is detected, the TWAIN source 24 will automatically start the scan and return the scanned image to the application 20. If checkbox 54 is not marked (i.e., disabled), the TWAIN source 24 does not check the status of the card sensor, but instead relies on user input such as clicking on a scan button of the UI to begin scanning the card.

Figure 5:
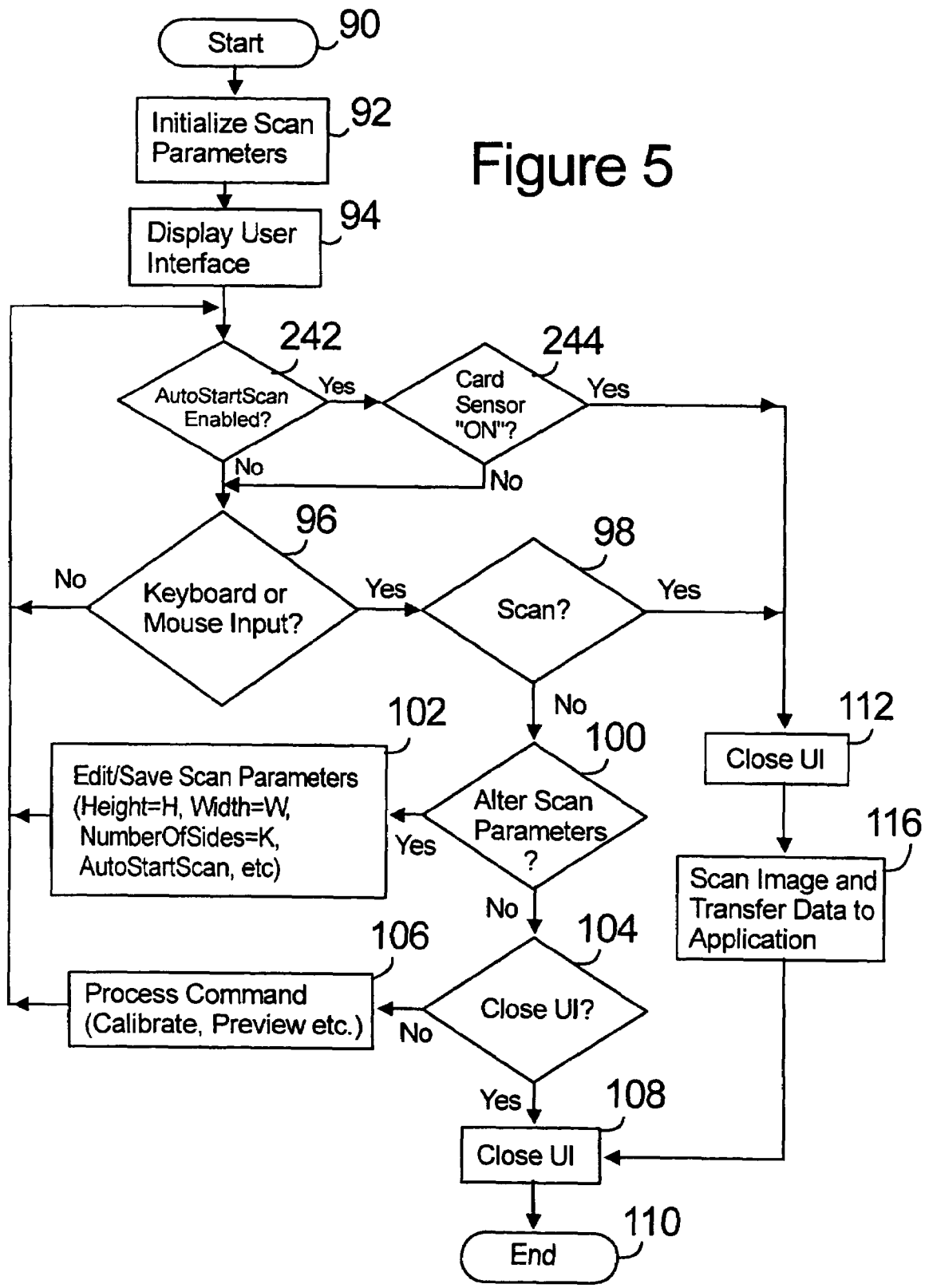
FIG. 5 is a flow diagram for a TWAIN source to scan multi-sided cards with the automatic card sensing feature.
Figure 6:
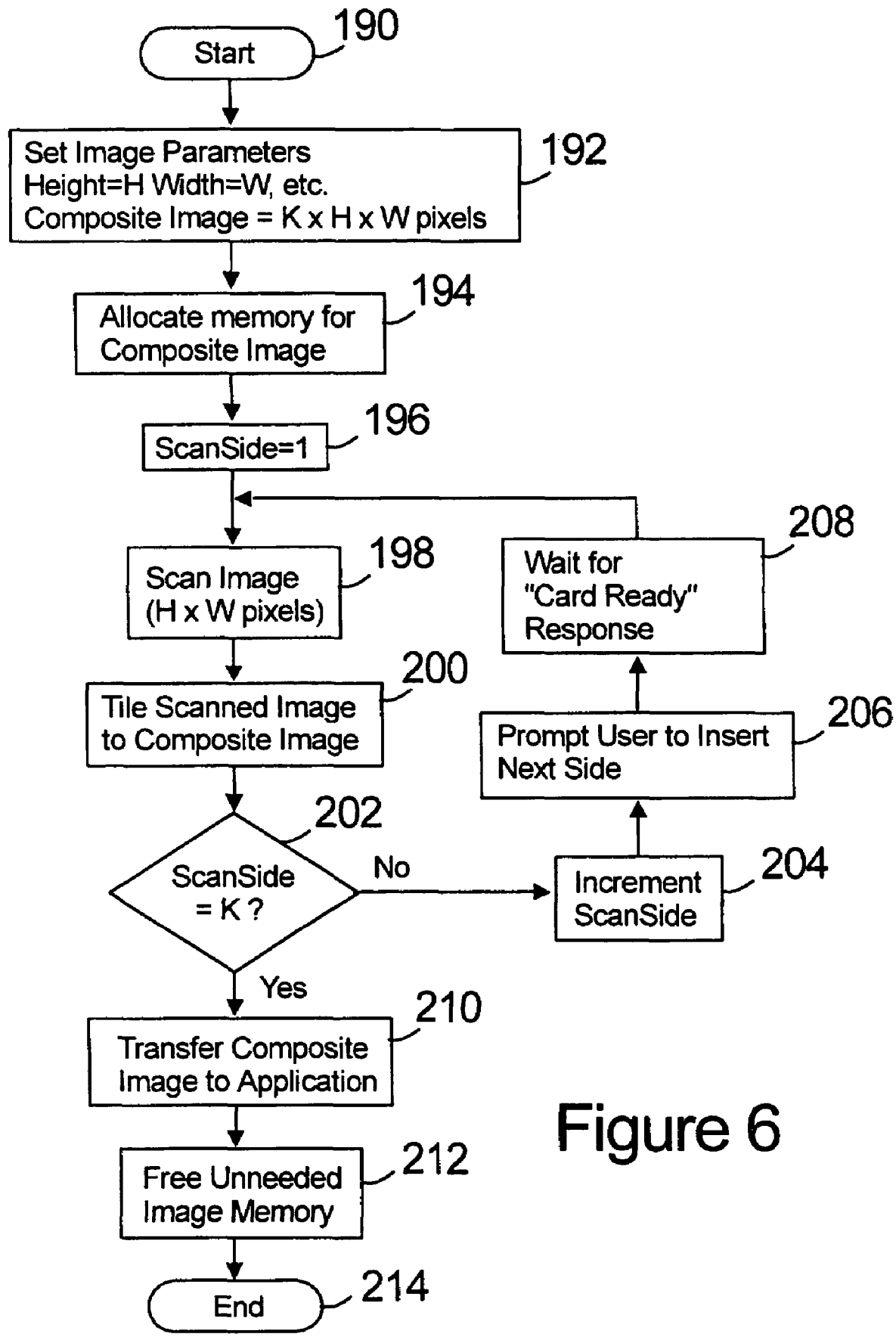
FIG. 6 is a flow diagram of the image scan and transfer method for multi-sided tiled images.
Figure 7:
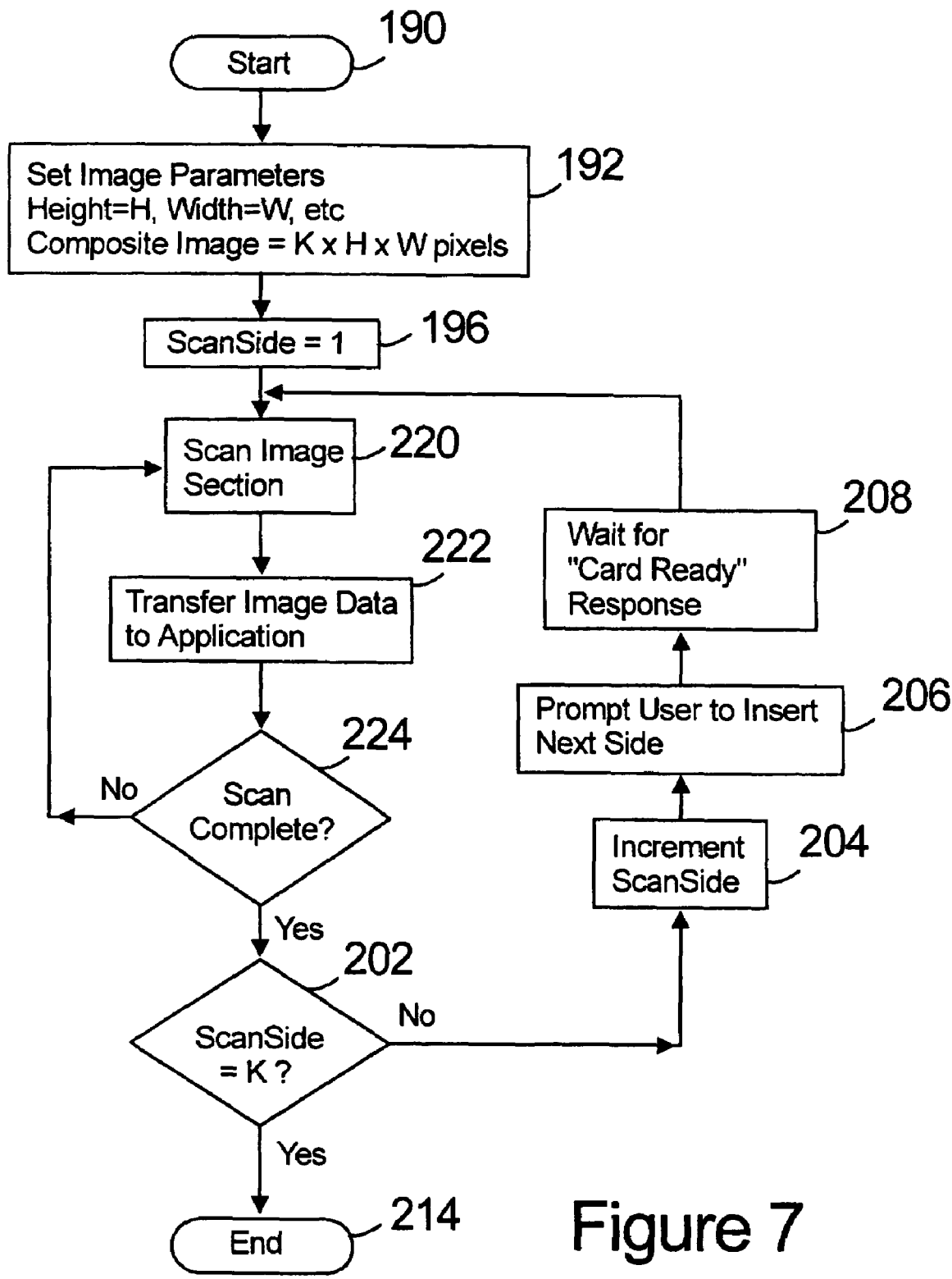
FIG. 7 is a flow diagram of the image scan and transfer method for multi-sided vertically tiled images using buffered memory transfer.

FIGS. 5-7 illustrate methods of scanning multi-sided cards (also documents) using the TWAIN specification which would be implemented as a program in the TWAIN source 24.

Referring to FIG. 5, the TWAIN source manager 22 (FIG. 1) begins a scan session by loading the TWAIN source 24 into computer memory when the application 20 initiates a request to scan from the physical scanner device 26. The program of the TWAIN source 24 starts at step 90 and at step 92 initializes the values of the scan parameters, such as image height, width, color mode, brightness, contrast, AutoStartScan for automatic scan start when a card is on the scanner device 26, and NumberOfSides for the number of sides to scan. The scan parameters are initially set to predetermined default values or to the last values used. At step 94, the program presents a user interface such as shown in FIG. 4 on the computer screen. From the UI, the user can view and edit the default scan parameters or process a command "A" or "B" representing a function such as calibrating the scanner device 26, starting the scan, or closing the UI to end the scan session.

After the UI is displayed, the program continues at step 242 where it checks if the AutoStartScan parameter is enabled. If it is not enabled, the program continues at step 96 to check for user input to the UI via keyboard or mouse input. If there is no user input, the program returns to step 242. If the user input is received, the program checks for a scan command at step 98. If there is no scan command, the program checks at step 100 if there is an edit input for altering the value of one of the scan parameters. If there is such an edit input, at step 102 the program alters and saves the value of the relevant scan parameter. After step 102, the program returns to step 242 to check the AutoStartScan parameter. If at step 100 the input is not an edit input to alter the scan parameters, the program checks at step 104 if it is a command to close the UI. If it is, the UI is closed at step 108, and the program terminates at step 110 to end the scan session. If step 104 is not a command to close the UI, the program transfers to step 106 where the input command is processed. After step 106, the program returns to step 242 to check the AutoStartScan parameter.

At step 98, if the user input is a scan command, the program closes the user interface at step 112. Step 112 may be skipped in implementations where it is preferred to keep the user interface displayed while the image is scanned. After step 112, the program scans the image at step 116 and transfers the scanned data from the TWAIN source 24 to the application 20. FIGS. 6 and 7 illustrate the details performed at step 116. After the image is scanned and transferred step 116, the program goes to step 108 to close the UI if it was not closed at step 112. The program terminates at step 110 to end the scan session.

If AutoStartScan is enabled at step 242, the program continues at step 244 where it checks the status of card sensor on the scanner device 26. If the card sensor is OFF, then the program continues at step 96 to check for keyboard or mouse input. If the card sensor is ON, the program continues at step 112 to close the UI and scan the image at step 116.

The flow diagram of FIG. 5 can be used to implement the UI of FIG. 2, which does not display checkboxes to enable/disable multi-sided scanning and the automatic scan feature. In these embodiments, the scan parameters AutoStartScan and NumberOfSides are hard coded into the program, read from a file, or passed to the TWAIN source 24 by function calls. Similarly, the flow diagram of FIG. 5 can be also used to implement a UI which displays only one of the checkboxes shown in FIG. 4.

FIGS. 6 and 7 illustrate the scan and transfer method performed by the program at step 116 shown in FIG. 5. Referring to FIG. 6, the program begins at step 190. At step 192 the program sets up image parameters such as image pixel height H, image pixel width W, and the number of sides K to scan. The size of the composite image to be created is (K×H×W) image pixels. The dimension of the composite image depends on the layout of the individual image sides within the composite image. For example, if the images are vertically tiled as illustrated in FIG. 3B, then the composite image height is (K×H) pixels, and the width is W pixels. If the images are horizontally tiled as in FIG. 3C, then the composite image height is H pixels, and the width is (K×W) pixels. After the dimension of the composite image is determined, the program passes the dimension and other information of the composite image via the TWAIN specification to the application 20 which initiated the scan.

At step 194, the program allocates sufficient computer memory to store the composite image. Step 196 initializes a variable ScanSide to 1, which keeps track of the number of image sides scanned. At steps 198 and 200, the TWAIN source 24 interfaces with the scanner device 26 to scan the composite image side and tiles the composite image data into computer memory. At step 202, the program checks if ScanSide is equal to K. If not, at step 204 ScanSide is incremented by one. Next, at step 206, the user is prompted to insert the next side of the card for scanning. The program then waits at step 208 for the user response to the prompt to indicate that the next side of the card is ready for scanning. The user response can be a keyboard or mouse click, or voice activated input on the computer, or a button click on the scanner device 26. It can also be the status of the card sensor on the scanner device 26, where the program polls the card sensor until it receives an ON status to indicate that the card is ready for scanning. When the user response is received, the program proceeds to steps 198 and 200 to scan and tile the next image side to the composite image. There is no restriction in the order or direction the individual image sides are tiled into the composite image. Steps 198, 200, 202, 204, 206, and 208 are repeated until ScanSide equals to K at step 202. At this point, all the required images sides are scanned into the composite image. The program now proceeds from step 202 to step 210 which transfers the composite image to the application 20 using the native, file or buffered memory transfer methods as specified by the TWAIN specification. After the transfer, at step 212 the program frees up any unneeded memory space allocated for storing or processing the image during scanning.

A significant reduction in the amount of memory needed to scan and transfer a composite image of individual tiled image sides can be realized if the tiling method used is restricted to vertical tiling, and the TWAIN Buffered Memory method is used for transferring the image data. In this case, it is possible to avoid the allocation of the relatively large composite image in the TWAIN source 24.

FIG. 7 is a flow diagram for the scan and transfer method for multi-sided documents or cards where the individual images are vertically tiled and the TWAIN buffered memory method is used for data transfer. Referring to FIG. 7, steps 190, 192 and 196 perform the same functions as the corresponding steps in FIG. 6. At step 220, the program commands the scanner device 26 to scan a section of the card image, e.g., the first few image rows that fit in the transfer memory buffer. The program transfers image data to the application 20 at step 222. At step 224, the program checks if all the rows of the current image side have been scanned. If not, the program returns to step 220 to scan the next image section, e.g., the next few rows after the last scan. Steps 220, 222 and 224 are repeated until all the rows of the current image side are scanned. When the scan is complete at step 224, the program checks at step 202 if ScanSide is equal to K. If not, the program at step 204 increments ScanSide by one. Steps 202, 204, 206 and 208 in FIG. 7 perform the same functions as the corresponding steps in FIG. 6. As shown in FIG. 7, the scanned image data is sent from the TWAIN source 24 to the application 20 by repeatedly transferring image data (i.e., consecutive image rows) through the memory buffer at step 222, one image section after another. This is similar to transferring a composite image of vertically tiled images of individual sides, and if desired may not perform the memory allocation step for the composite image at step 194 of FIG. 6.

Figure 8:
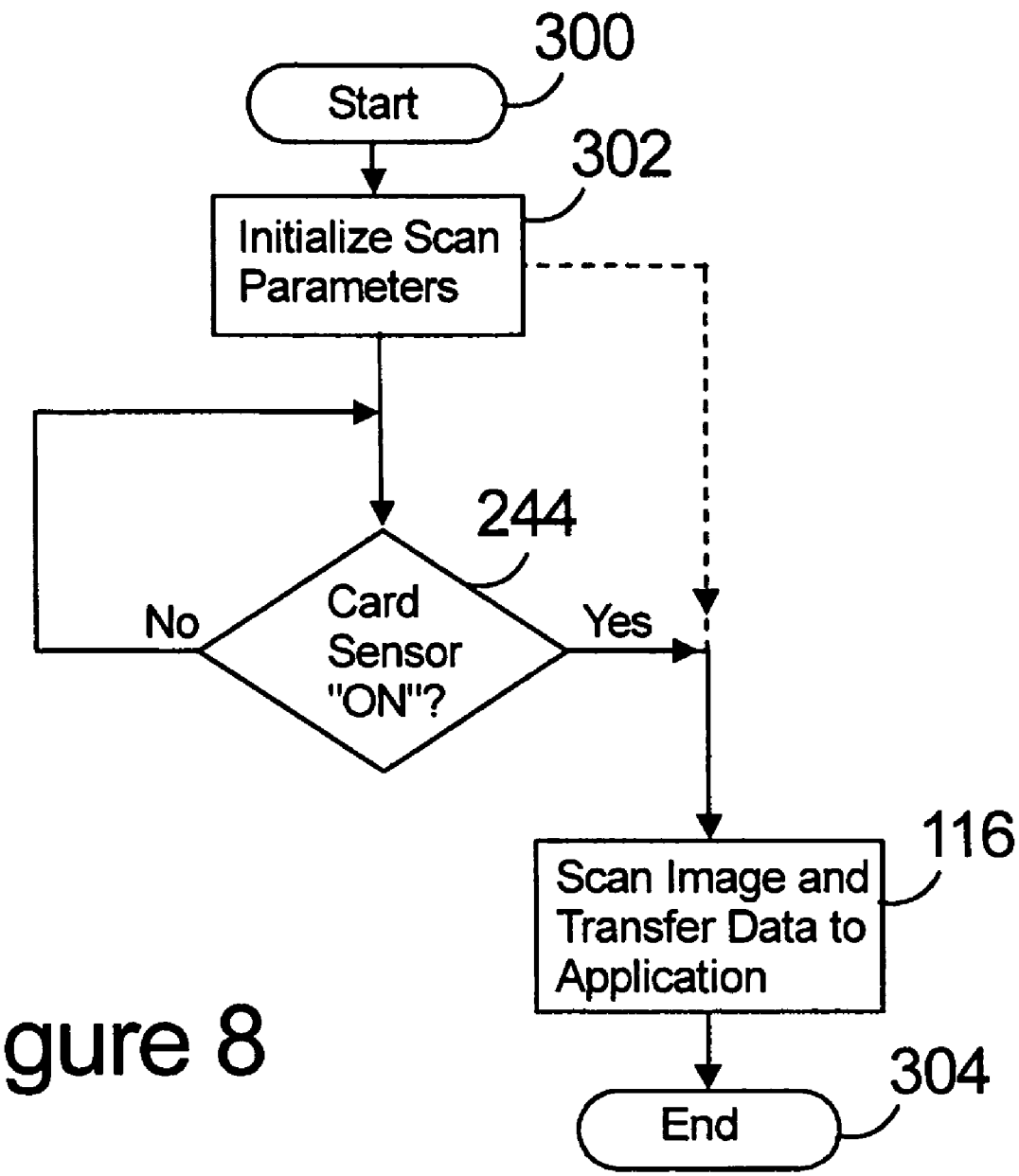
FIG. 8 is a flow diagram for a TWAIN source to scan multi-sided cards with the automatic card sensing feature without displaying the TWAIN source user interface.

An application 20 can call the TWAIN source 24 to scan an image without displaying the source user interface. FIG. 8 illustrates the flow diagram for the TWAIN source 24 that does not display a user interface. The program starts at step 300. At step 302, the program initializes the scan parameters by one or a combination of the following methods of parameter initialization: (1) function calls to the TWAIN API; (2) reading preset parameter values from a file; or (3) referencing hard coded parameter values in the TWAIN source 24. Next, the program waits at step 244 for the card sensor to turn ON when a card is loaded onto the scanner device 26. On detection of a card, the program proceeds to scan the image at step 116, which is illustrated in FIGS. 6 and 7. After scanning, the image is sent to the application 20 and the program ends at step 304. The flow diagram can be implemented without the use of the card sensor at step 244. This implementation is indicated by the dotted line in FIG. 8. The program initializes the scan parameters at step 302 and proceeds directly to step 116 to scan in the image.

What is claimed:

1. A method of scanning multi-sided documents, comprising:
   (a) using a TWAIN source to control scanning of multiple sides a multi-sided document by a scanning device;
   (b) producing, by the TWAIN source, a composite image by tiling the images of individual sides of the multi-sided document vertically, horizontally, or a combination of vertical and horizontal placements; and
   (c) transferring, using a TWAIN protocol, the composite image from the TWAIN source to an application running on a computing device.

2. The method of claim 1, wherein the scanning of multiple sides of the multi-sided document includes:
   prompting a user to insert a next side of the multi-sided document in the scanning device;
   detecting a ready response when the next side of the multi-sided document is ready for scanning; and,
   scanning the next side of the multi-sided document when the ready response is received.

3. The method of claim 2, wherein the detecting includes reading an ON/OFF status of a document sensor on the scannng device.

4. The method of claim 2, wherein the detecting includes receiving user input from a keyboard, a mouse, a voice activated device, or a button on the scanning device.

5. The method of claim 1, further comprising displaying a TWAIN source user interface for a user to select or edit scanning parameters and options.

6. The method of claim 5, wherein the TWAIN source user interface includes at least one of the following:
   an option to select single or multi-sided scanning;
   an option to enable the use of a document sensor to automatically start scanning when a document is detected on the scanning device.

7. The method of claim 1, wherein the multi-sided document is a card.

8. A method of scanning multi-sided documents, comprising:
   (a) using a TWAIN source to control scanning of multiple sides of a multi-sided document by a scanning device;
   (b) transferring a single composite image for the multi-sided document from the TWAIN source to a TWAIN application, the single composite image being produced by the TWAIN source and being composed of vertically tiled images, each of the vertically tiled images being an image of one side of the multi-sided document, wherein the single composite image is transferred by sequentially scanning and transferring consecutive image rows of each side of the multi-sided document using a TWAIN buffered memory transfer method.

9. The method of claim 8, wherein the scanning of multiple sides of the multi-sided document includes:
   prompting a user to insert a next side of the multi-sided document in the scanning device;
   detecting a ready response when the next side of the multi-sided document is ready for scanning; and,
   scanning the next side of the multi-sided document when the ready response is received.

10. The method of claim 9, further comprising displaying a TWAIN source user interface for the user to select or edit scanning parameters.

11. The method of claim 10, wherein the TWAIN source user interface includes at least one of the following:
    an option to select single or multi-sided scanning;
    an option to enable the use of the document sensor to start scanning when a document is detected.

12. The method of claim 9, wherein the detecting includes reading the ON/OFF status of a document sensor on the scanning device.

13. The method of claim 9, wherein the detecting includes receiving user input from a keyboard, a mouse, a voice activated device, or a button on the scanning device.

14. The method of claim 8, wherein the multi-sided document is a card.

15. A method of scanning documents, comprising:
    (a) displaying a TWAIN source user interface which allows a user to select scanning of a multi-sided document; and
    (b) controlling, by use of a TWAIN source, scanning performed by a scanning device, including,
    when scanning of a multi-sided document is selected by the user, creating, by the TWAIN source, a single composite image that includes images of all sides of the multi-sided document and forwarding the single composite image from the TWAIN source to an application running on a computing system.

16. The method of claim 15, further comprising:
    closing automatically the user interface when the scanning starts or when the scanning is completed.

17. The method of claim 15, additionally comprising:
    providing an option in the TWAIN source user interface to enable/disable the use of a document sensor and when the document sensor is enabled, controlling scanning by the TWAIN source includes:
    waiting for user input to the user interface, checking the status of the document sensor on the scanning device when the use of the sensor is enabled, and scanning automatically when a document is detected at the sensor when the use of the sensor is enabled.

18. The method of claim 15, wherein the document is a card.

* * * * *